US011415376B2

(12) United States Patent
Kadu et al.

(10) Patent No.: US 11,415,376 B2
(45) Date of Patent: Aug. 16, 2022

(54) END CAP FOR PANEL ASSEMBLY OF AN HVAC SYSTEM

(71) Applicant: Johnson Controls Technology Company, Auburn Hills, MI (US)

(72) Inventors: Bhushan C. Kadu, Pune (IN); Ravindra B. Salunkhe, Satara (IN); Shridhar V. Vernekar, Sirsi (IN); Kunal J. Gandevia, Pune (IN); Yogesh P. Kamat, Pune (IN); Nitin A. Kurane, Kolhapur (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 293 days.

(21) Appl. No.: 16/591,408

(22) Filed: Oct. 2, 2019

(65) Prior Publication Data

US 2021/0102761 A1 Apr. 8, 2021

(51) Int. Cl.
| | | |
|---|---|---|
| *F28F 9/013* | (2006.01) | |
| *F28F 9/00* | (2006.01) | |
| *B23Q 1/01* | (2006.01) | |
| *F24F 13/20* | (2006.01) | |
| *F28F 9/26* | (2006.01) | |

(52) U.S. Cl.
CPC ............ *F28F 9/0131* (2013.01); *B23Q 1/015* (2013.01); *F24F 13/20* (2013.01); *F28F 9/001* (2013.01); *F28F 9/26* (2013.01)

(58) Field of Classification Search
CPC ............... F24F 13/20; F24F 2013/202; F24F 2013/205; F24F 2013/207; E04F 1/14; E04F 1/7608; E04F 1/7654; E04F 1/7604; F25D 23/063; F25D 23/065; B65D 81/38; B65D 81/3823; E04C 2/384; E04C 2/292; F16B 12/46; F16B 12/50; E04B 2001/3282; A47B 95/043; A47B 95/04; A47B 2095/046; F16L 59/024; F16L 59/02; B32B 15/046; B32B 2307/304
See application file for complete search history.

(56) References Cited

U.S. PATENT DOCUMENTS

| | | | | |
|---|---|---|---|---|
| 1,719,605 | A * | 7/1929 | Gerberich | ............... A47B 13/08 |
| | | | | 52/782.2 |
| 3,400,028 | A * | 9/1968 | Wikholm | ................. B65D 9/30 |
| | | | | 156/286 |

(Continued)

FOREIGN PATENT DOCUMENTS

| | | | |
|---|---|---|---|
| CN | 202804659 U | 3/2013 | |
| EP | 0794312 A1 * | 2/1997 | ............... F16B 12/46 |

(Continued)

*Primary Examiner* — Jianying C Atkisson
*Assistant Examiner* — For K Ling
(74) *Attorney, Agent, or Firm* — Fletcher Yoder, P.C.

(57) ABSTRACT

A heating, ventilation, and/or air conditioning (HVAC) system includes a panel assembly having a first face and a second face terminating in a corner. The HVAC system also includes an end cap having a first surface and a second surface that are joined at a vertex. The end cap extends over the corner of the panel assembly such that the first surface of the end cap extends along the first face and the second surface of the end cap extends along the second face. The end cap includes a rib extending from the vertex and into a slot formed at the corner between the first face and the second face.

24 Claims, 9 Drawing Sheets

(56) References Cited

U.S. PATENT DOCUMENTS

| | | | |
|---|---|---|---|
| 4,189,885 A | 2/1980 | Fritz | |
| 4,320,614 A * | 3/1982 | Brezosky | E04C 2/52 |
| | | | 52/287.1 |
| 4,509,806 A * | 4/1985 | Dudouyt | F16B 12/02 |
| | | | 108/180 |
| 7,090,313 B1 | 8/2006 | McMurray | |
| 8,561,956 B2 * | 10/2013 | Tao | A47B 95/043 |
| | | | 248/345.1 |
| 2006/0070329 A1 | 4/2006 | Schiltz | |
| 2009/0282760 A1 * | 11/2009 | Sampson | E04F 15/02423 |
| | | | 52/794.1 |
| 2016/0215997 A1 * | 7/2016 | Carlyon | F24F 13/20 |
| 2018/0073767 A1 * | 3/2018 | Carton | F24F 13/0263 |

FOREIGN PATENT DOCUMENTS

| | | | | |
|---|---|---|---|---|
| EP | 1770227 A2 * | 4/2007 | | B32B 15/046 |
| GB | 512067 A * | 8/1939 | | A47B 95/04 |
| KR | 101690519 B1 | 12/2016 | | |
| WO | 0055447 A1 | 9/2000 | | |

\* cited by examiner

END CAP FOR PANEL ASSEMBLY OF AN HVAC SYSTEM

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as an admission of any kind.

HVAC systems are utilized in residential, commercial, and industrial environments to control environmental properties, such as temperature and humidity, for occupants of the respective environments. The HVAC system may regulate such environmental properties through control of an air flow delivered to the environment by a blower or a fan. Indeed, the blower may be configured to direct air across a heat exchanger of the HVAC system to facilitate exchange of thermal energy between the air and a refrigerant flowing through tubes of the heat exchanger. The heat exchanger is typically positioned within an enclosure of the HVAC system, which may define a portion of a flow path extending between the heat exchanger and rooms or spaces within a building or other suitable structure serviced by the HVAC system. As such, the blower may direct conditioned air discharging from the heat exchanger along the flow path to the rooms or spaces of the building.

Generally, HVAC enclosures may be assembled from a plurality of panel assemblies. In certain cases, each of the panel assemblies includes an interior space formed therein, which may be configured to receive an insulating material. The insulating material may improve a thermal resistance of the panel assemblies and enable the panel assemblies to mitigate heat transfer between the conditioned air flowing through the HVAC enclosure and an ambient environment surrounding the HVAC enclosure. In many cases, the insulating material may be injected into the interior space of the panel assemblies during manufacture of the panel assemblies. Unfortunately, the insulating material may leak from the interior space during manufacture of the panel assemblies.

SUMMARY

The present disclosure relates to a heating, ventilation, and/or air conditioning (HVAC) system that includes a panel assembly having a first face and a second face terminating in a corner. The HVAC system also includes an end cap having a first surface and a second surface that are joined at a vertex. The end cap extends over the corner of the panel assembly such that the first surface of the end cap extends along the first face and the second surface of the end cap extends along the second face. The end cap includes a rib extending from the vertex and into a slot formed at the corner between the first face and the second face.

The present disclosure also relates to a panel assembly of a heating, ventilation, and/or air conditioning (HVAC) system. The panel assembly includes an outer panel and an inner panel nested within the outer panel, where the outer panel has a first face and a second face terminating in a corner. The panel assembly includes an end cap having a first surface and a second surface that are joined at a vertex, where the end cap extends over the corner of the outer panel such that the first surface extends along the first face and the second surface extends along the second face. The end cap includes a protrusion extending from the vertex, where the protrusion is extends into a notch within the outer panel of the panel assembly to couple the end cap to the outer panel in a snap-fit arrangement.

The present disclosure also relates to an end cap for a panel assembly of a heating, ventilation, and/or air conditioning (HVAC) system. The end cap includes a first flange, a second flange extending crosswise from the first flange at a vertex, and a rib extending from the vertex. The rib is configured to extend into a first slot in an outer panel of the panel assembly and into a second slot in an inner panel of the panel assembly that is nested in the outer panel. The end cap also includes a protrusion extending from the first flange, the second flange, and the vertex, where the protrusion is configured to extend into an opening formed in the outer panel.

DETAILED DESCRIPTION

Figure 1:
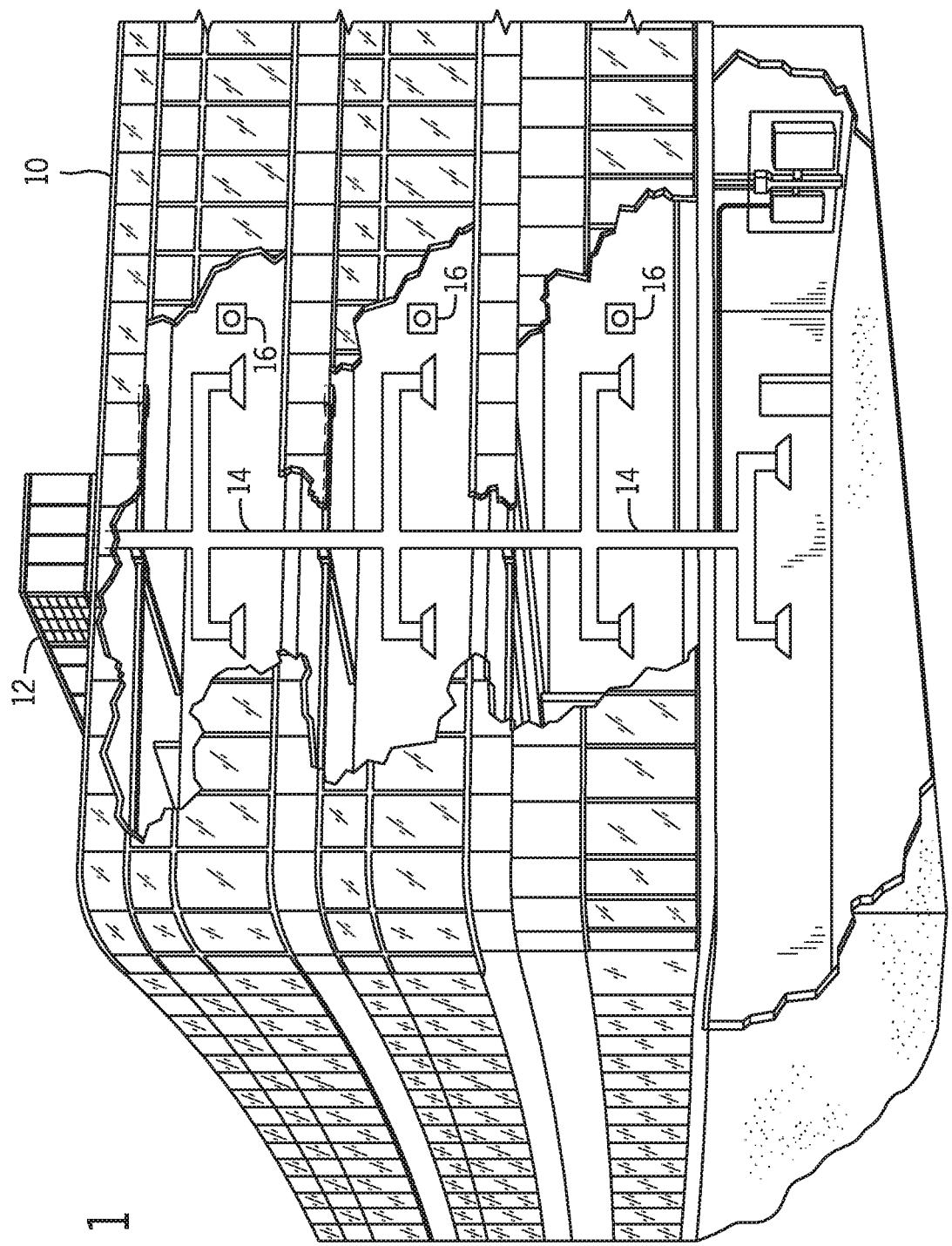
FIG. 1 is a perspective view of an embodiment of a building that may utilize a heating, ventilation, and/or air conditioning (HVAC) system in a commercial setting, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

A heating, ventilation, and/or air conditioning (HVAC) system may be used to thermally regulate a space within a building, home, or other suitable structure. The HVAC system generally includes a vapor compression system that transfers thermal energy between a heat transfer fluid, such as a refrigerant, and a fluid to be conditioned, such as air. The vapor compression system typically includes a condenser and an evaporator that are fluidly coupled to one another via conduits to form a refrigerant circuit. A compressor of the refrigerant circuit may be used to circulate the refrigerant through the conduits and enable the transfer of thermal energy between the condenser and the evaporator.

The HVAC system generally includes an enclosure that may house certain heat transfer components of the HVAC system, such as the evaporator. The enclosure may define a flow path that enables a blower or fan to force an air flow along the flow path and across the evaporator. As such, the blower may facilitate heat exchange between the air flow and the refrigerant circulating through the refrigerant circuit and enable the evaporator to output a flow of conditioned air that may be discharged from the enclosure and directed to a suitable room or space within the building.

As briefly discussed above, the HVAC enclosure is typically formed from a plurality of panel assemblies. In some embodiments, certain of the panel assemblies include an inner panel that is nested within an outer panel to encapsulate a space, referred to herein as an insulating space, between the inner and outer panels. The insulating space may be configured to receive an insulating material, such as expanding foam or another suitable insulator, during manufacture of the panel assembly. For example, a particular panel assembly may include one or more openings formed therein that enable an injection tool to inject a flow of liquid expanding foam into the insulating space. The expanding foam may be configured to expand or otherwise increase in volume upon being injected into the insulating space, thereby enabling the expanding foam to occupy substantially all of the insulating space. Typically, the expanding foam is configured to cure and harden into a solid state upon lapse of a particular time interval or upon application of thermal energy to the expanding foam. The expanding foam may increase an overall thermal resistance of the assembled panel assembly and thereby enable the panel assembly to mitigate heat transfer between the conditioned air flowing along the flow path of the HVAC enclosure and an ambient environment surrounding the HVAC enclosure.

In many cases, the inner panel and the outer panel of the panel assembly each include a lip or a flange that extends about a respective perimeter of the inner and outer panels. Corner portions of the lips typically include a slot formed therein, which may be formed during manufacture of the inner and outer panels. In certain cases, when the inner and outer panels are assembled into the panel assembly, the slots within the lip of the inner panel may align with the slots within the lip of the outer panel. As a result, the slots may form gaps or passages at corners of the panel assembly that extend into the insulating space of the panel assembly. Adhesives such as silicone or foam tape are generally used to block or cover the gaps to impede leakage of expanding foam through the gaps during manufacture of the panel assembly. Unfortunately, adhesives may tear or become dislodged from the gaps during expansion of the expanding foam within the insulating space, which may cause the expanding foam to leak from the panel assembly prior to curing and hardening within the insulating space. Such leakage of the expanding foam may increase manufacturing costs of the panel assembly and/or reduce an overall thermal resistance of the assembled panel assembly.

It is now recognized that blocking leakage of insulating material from a panel assembly during manufacture of the panel assembly may reduce manufacturing costs of the panel assembly and enhance an insulating effectiveness of the panel assembly.

Therefore, embodiments of the present disclosure are directed to an end cap that is couplable to the panel assembly to block leakage of insulating material via the gaps of the panel assembly. For example, the end cap may include a retention feature, such as a rib and/or a protrusion, which is configured to engage with one of the gaps within the panel assembly to cover and/or block the gap. Accordingly, the end cap may block the leakage of insulating material from the insulating space of the panel assembly, particularly during manufacture of the panel assembly. These and other features will be described below with reference to the drawings.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
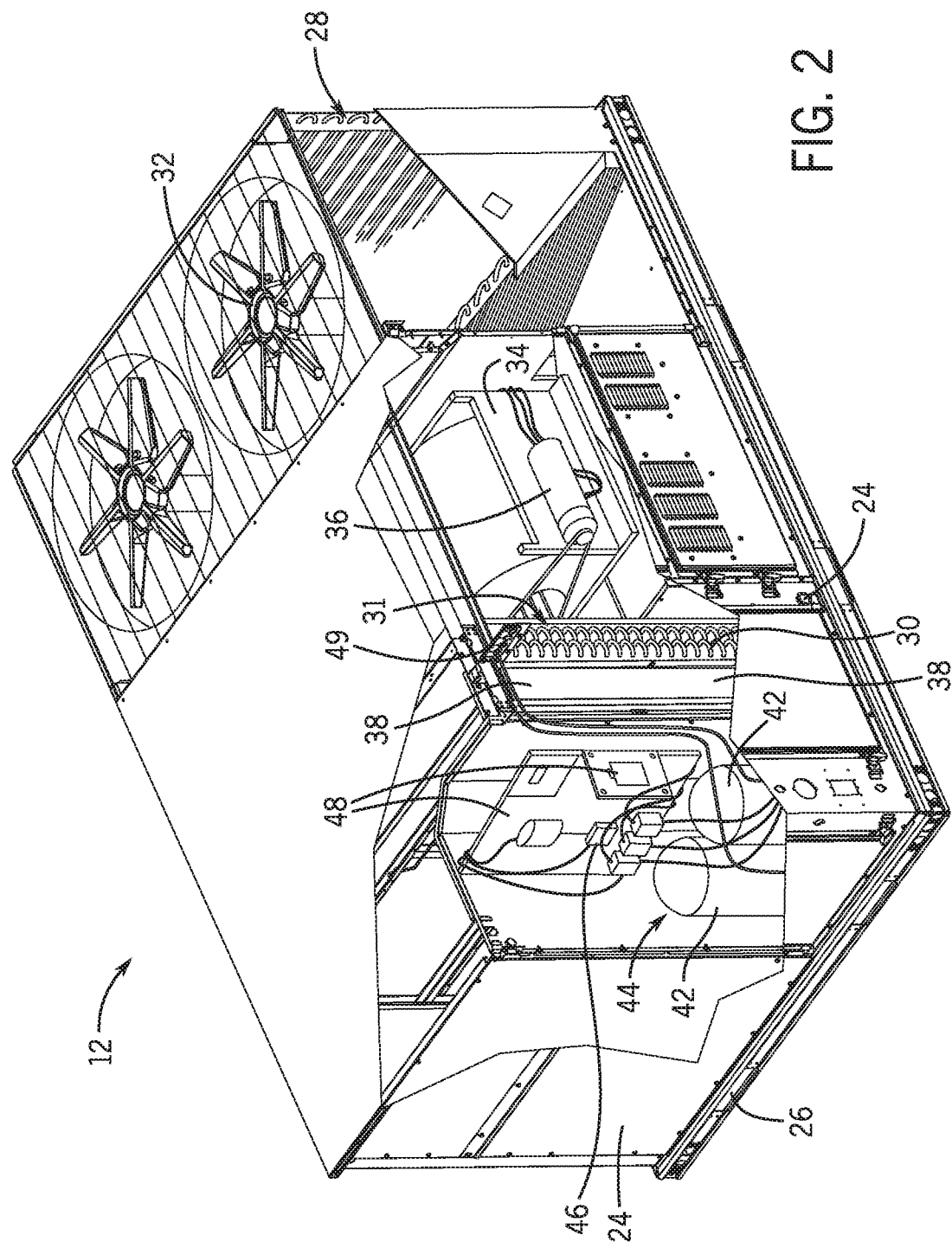
FIG. 2 is a perspective view of an embodiment of a packaged HVAC unit, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
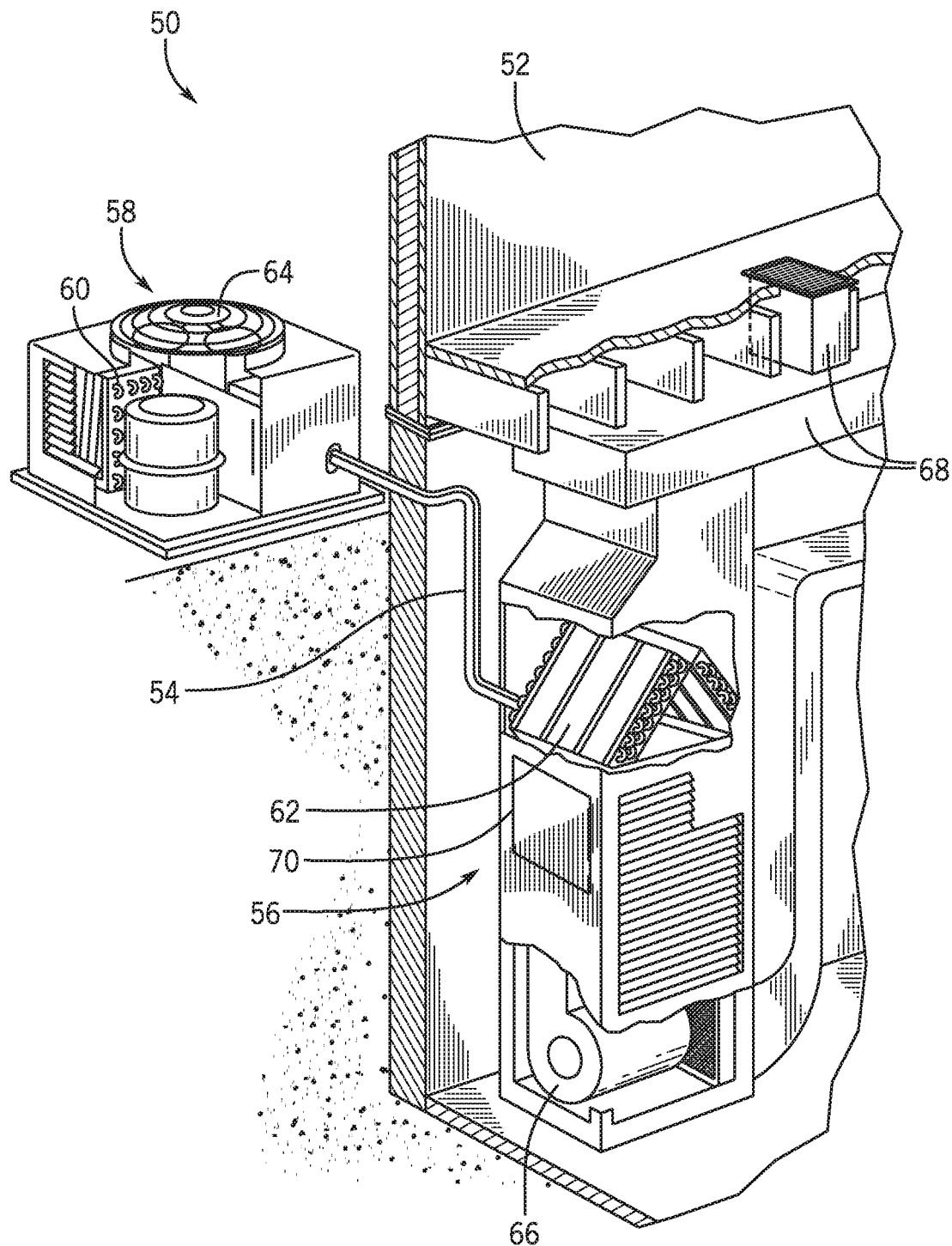
FIG. 3 is a perspective view of an embodiment of a split, residential HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit 56 functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
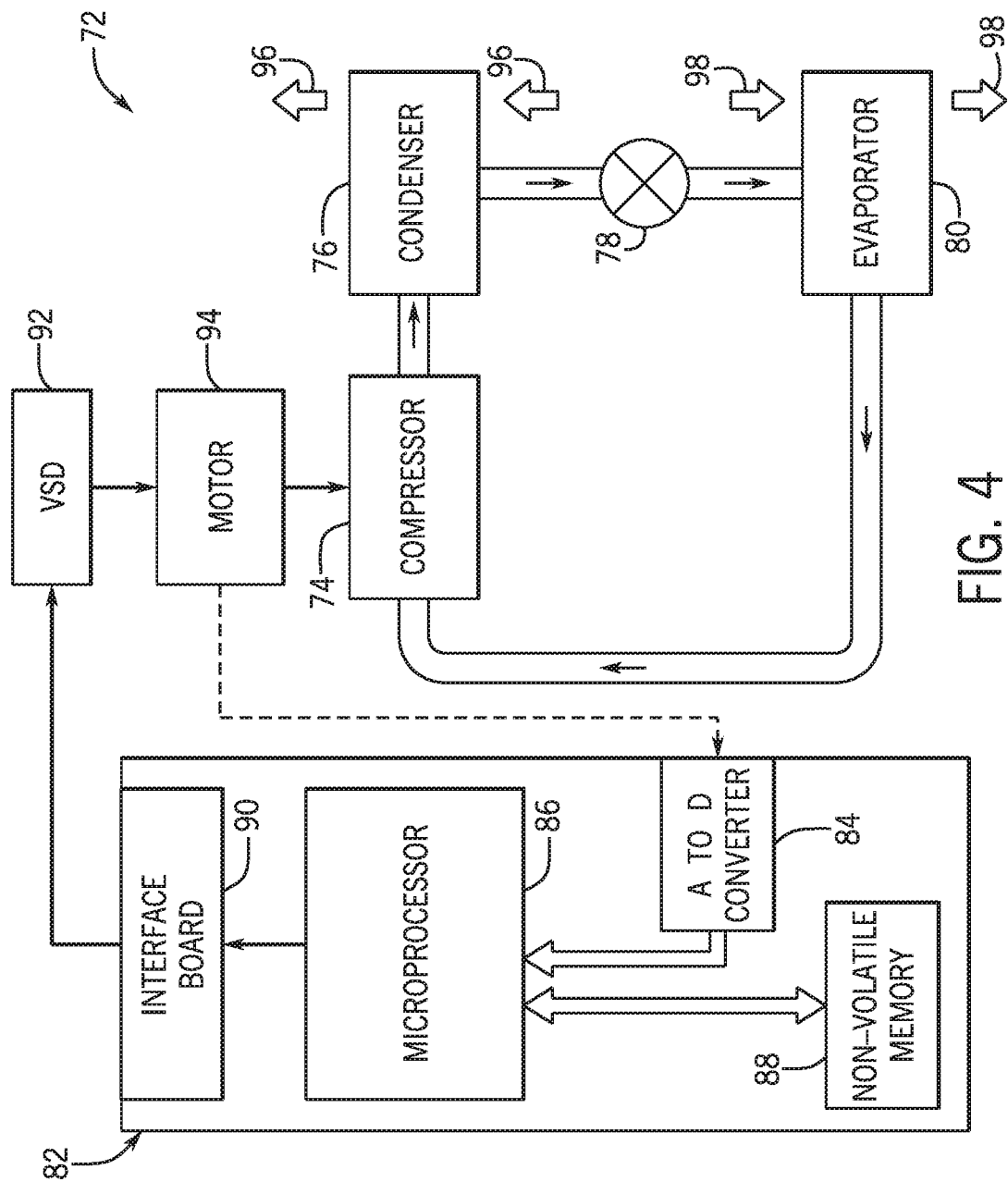
FIG. 4 is a schematic diagram of an embodiment of a vapor compression system that may be used in an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
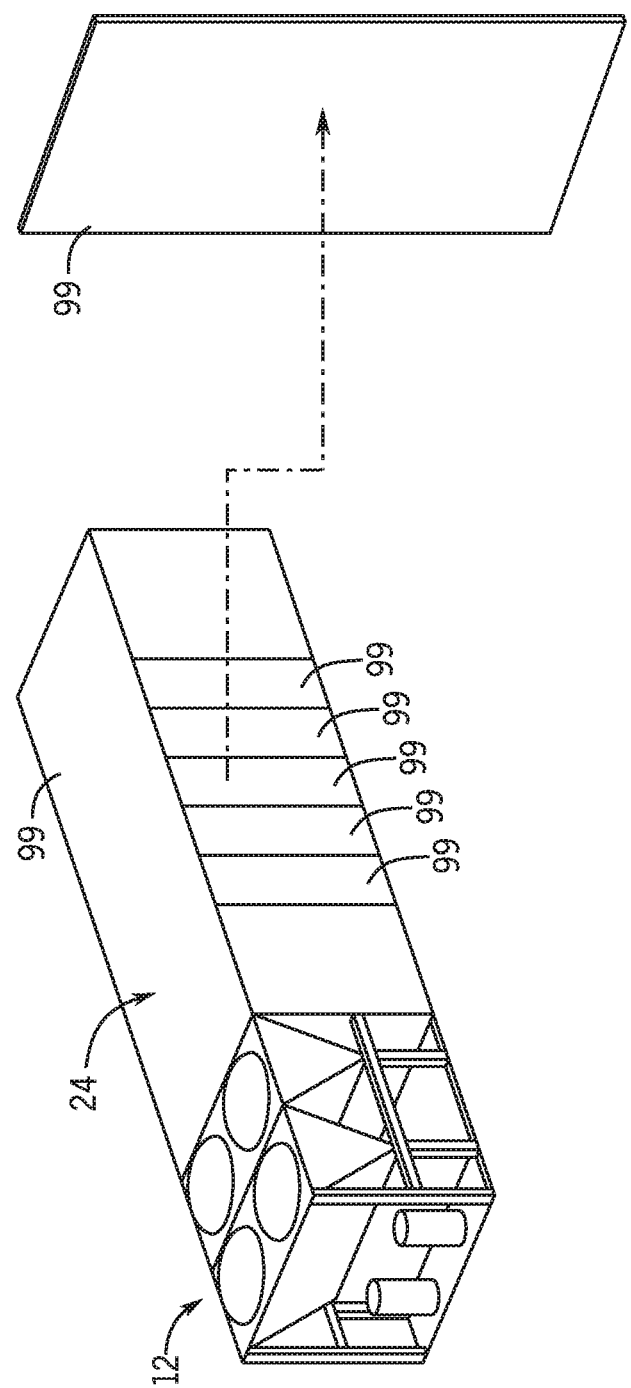
FIG. 5 is a perspective view of an embodiment of a packaged HVAC unit having a plurality of panel assemblies, in accordance with an aspect of the present disclosure.

As noted above, certain HVAC enclosures may be assembled from or more panel assemblies that include an insulating material disposed therein. For example, to provide context for the following discussion, FIG. 5 is a perspective view of an embodiment of the HVAC unit 12 that includes a plurality of panel assemblies 99. As shown in the illustrated embodiment, the panel assemblies 99 may be used to construct the cabinet 24 of the HVAC unit 12. That is, each of the panel assemblies 99 may be used to form a door, a roof panel, a side wall, a floor panel, or another suitable panel or portion of the cabinet 24.

In some embodiments, during manufacture of the panel assemblies 99, liquid insulating material may be injected into a respective insulating space within each of the panel assemblies 99. The insulating material may be configured to expand and occupy substantially all of the insulating space within a particular panel assembly 99. The insulating material may also harden into a solid state within the insulating space. Accordingly, the insulating material may enhance an overall thermal resistance of the panel assemblies 99. Unfortunately, respective corners of the panel assemblies 99 may include gaps formed therein that enable the insulating material to leak form the panel assemblies 99 prior to hardening of the insulating material within the panel assemblies 99. Accordingly, embodiments of the present disclosure are directed toward an end cap or a corner cap that is configured to block the gaps formed at the respective corners of the panel assemblies 99 to mitigate or substantially eliminate such leakage of insulating material from the panel assemblies 99.

Figure 6:
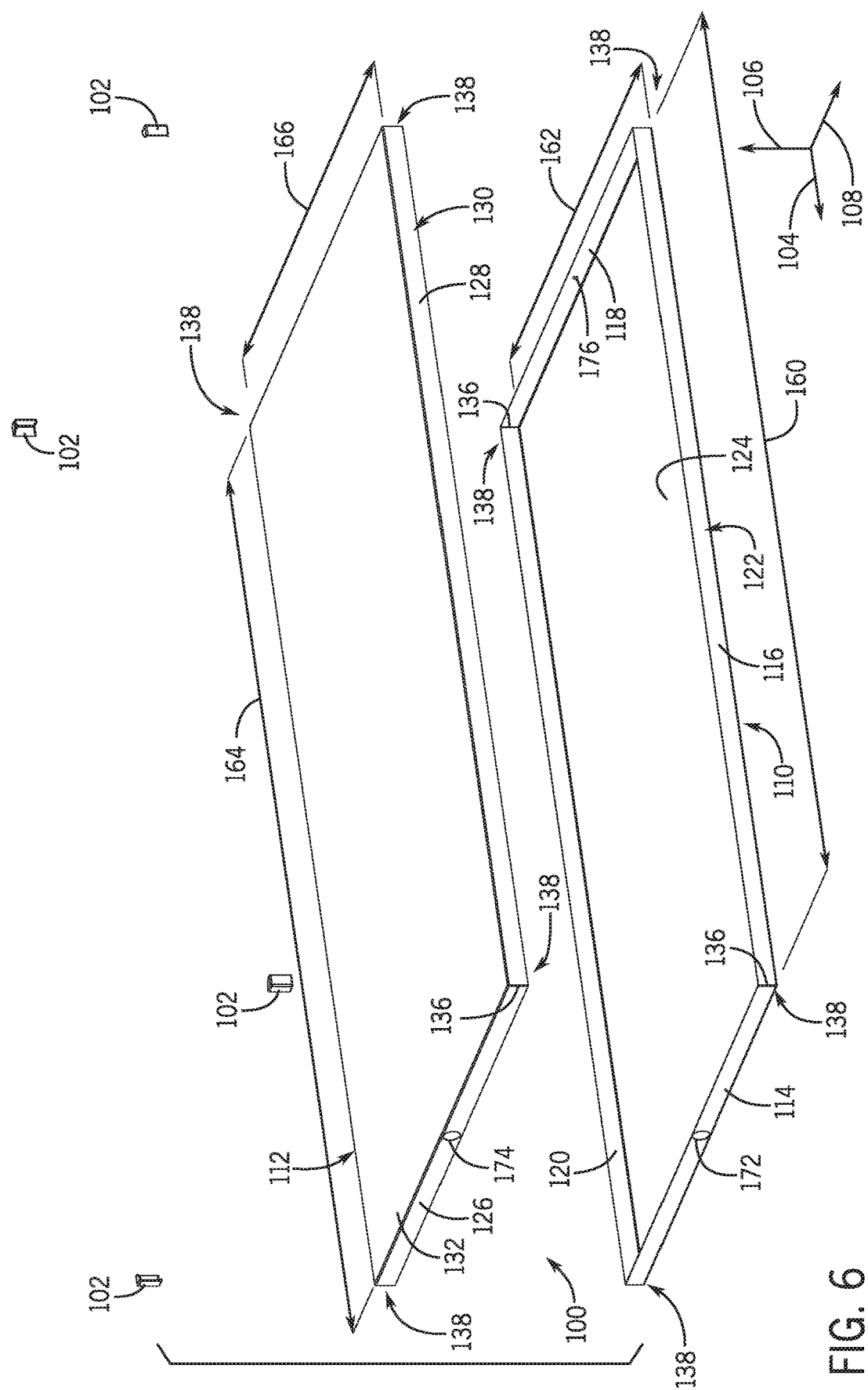
FIG. 6 is an exploded perspective view of an embodiment of a panel assembly for an HVAC system, in accordance with an aspect of the present disclosure.

With the foregoing in mind, FIG. 6 is an exploded perspective view of an embodiment of one of the panel assemblies 99, referred to herein as a panel assembly 100, which includes a plurality of end caps 102, also be referred to herein as corner caps. It should be noted that the panel assembly 100 and/or the end caps 102 may be included in embodiments or components of the HVAC unit 12 shown in FIGS. 1 and 5, embodiments or components of the split, residential heating and cooling system 50 shown in FIG. 3, a rooftop unit (RTU), or any other suitable HVAC system. To facilitate discussion, the panel assembly 100, the end caps 102, and their respective components, will be described with reference to a longitudinal axis 104, a vertical axis 106, and a lateral axis 108.

In the illustrated embodiment, the panel assembly 100 includes an outer panel 110 and an inner panel 112 that, as discussed below, are configured to engage with one another in a nested configuration. The outer panel 110 includes a first flange 114 or a first face, a second flange 116 or a second face, a third flange 118 or a third face, and a fourth flange 120 or a fourth face that collectively define a first lip 122 of the outer panel 110. The first lip 122 may extend generally crosswise from a first base portion 124 of the outer panel 110. The inner panel 112 includes a first flange 126 or a first face, a second flange 128 or a second face, a third flange or a third face, and a fourth flange or a fourth face that collectively define a second lip 130 of the inner panel 112. Similarly to the first lip 122 of the outer panel 110, the second lip 130 may extend generally crosswise from a second base portion 132 of the inner panel 112. In certain embodiments, the first lip 122 and the second lip 130 may define respective perimeters of the outer and inner panels 110, 112. It should be understood that, the first flange 114, the second flange 116, the third flange 118, and the fourth flange 120 may be referred to herein as a first face, a second face, a third face, and a fourth face, respectively, of the panel assembly 100.

In some embodiments, each of the outer and inner panels 110, 112 may be a single-piece component that is bent or deformed to include the respective features of the outer and inner panels 110, 112. For example, the outer panel 110, the inner panel 112, or both, may each be formed from a single piece of metallic material, such as stamped steel. In certain embodiments, respective slots 136 may be formed within corner portions 138 of the outer and inner panels 110, 112 during manufacture of the outer and inner panels 110, 112. In particular, the slots 136 may be formed when the first, second, third, and fourth flanges 114, 116, 118, 120 of the outer panel 110 are bent or deformed into the shape of the first lip 122, and may be formed when the first, second, third, and fourth flanges 126, 128 of the inner panel 112 are bent or deformed into the shape of the second lip 130.

Figure 7:
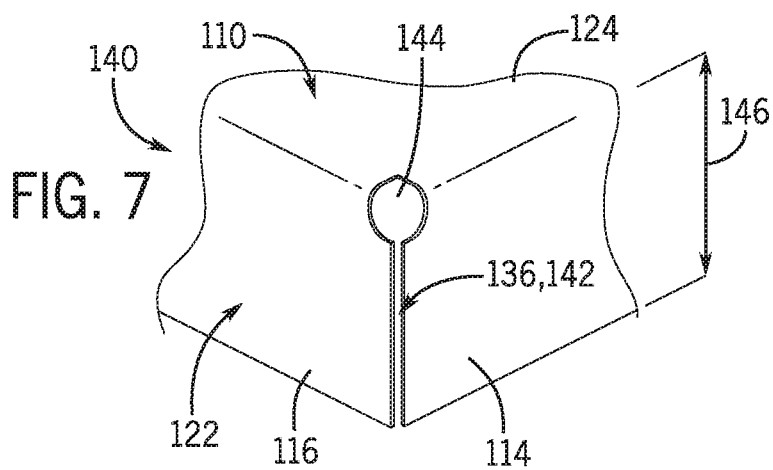
FIG. 7 is a perspective view of an embodiment of a corner of a panel for a panel assembly, in accordance with an aspect of the present disclosure.

To better illustrate one of the slots 136 of the outer panel 110 and to facilitate the following discussion, FIG. 7 is a perspective view of a first corner 140 of the outer panel 110. It should be understood that a second corner, a third corner, and a fourth corner of the outer panel 110 may each include some or all of the features of the first corner 140 discussed herein. Moreover, as discussed below, it should be understood that, the first corner 140, the second corner, the third corner, and the fourth corner of the outer panel 110 may define respective corners of the panel assembly 100. As shown in the illustrated embodiment, the first corner 140 includes a first slot 142 that extends between an end of the first flange 114 and an end of the second flange 116. As such, the first slot 142 is formed within the first lip 122 of the outer panel 110. In some embodiments, the first slot 142 extends into an opening 144, also referred to herein as a notch, which is formed within the first corner 140. The opening 144 may extend through the first flange 114, the second flange 116, and the first base portion 124. In other embodiments, the opening 144 may extend through the first flange 114, the second flange 116, or both, without extending through the first base portion 124. Moreover, it should be appreciated that, in certain embodiments, the opening 144 may be omitted from the first corner 140. In such embodiments, the first slot 142 may extend along respective widths 146 of the first flange 114 and the second flange 116.

Figure 8:
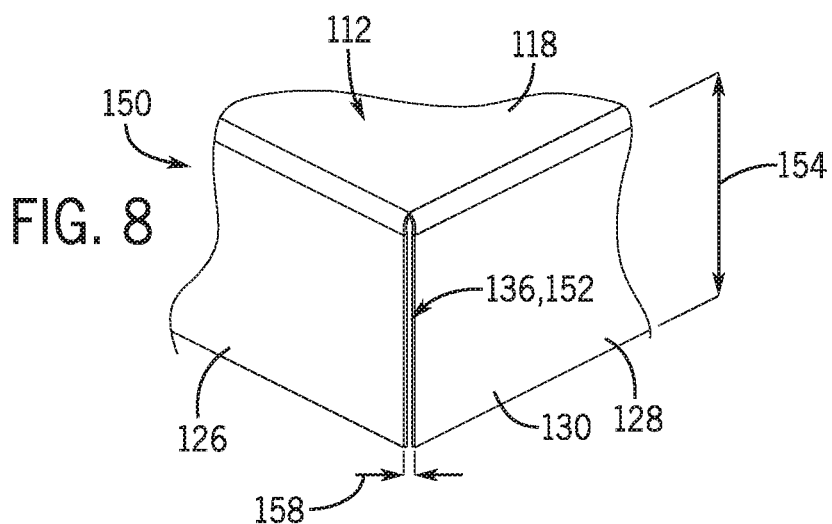
FIG. 8 is a perspective view of an embodiment of a corner of a panel for a panel assembly, in accordance with an aspect of the present disclosure.

FIG. 8 is a perspective view of a first corner 150 of the inner panel 112. It should be understood that a second corner, a third corner, and a fourth corner of the inner panel 112 may each include some or all of the features of the first corner 150 discussed herein. As shown in the illustrated embodiment, the first corner 150 includes a second slot 152 that extends between an end of the first flange 126 and an end of the second flange 128. As such, the second slot 152 is formed within the second lip 130 of the inner panel 112. The second slot 152 may extend along respective widths 154 of the first flange 126 and the second flange 128. In some embodiments, a width 158 of the second slot 152 may be substantially equal to a respective width of the first slot 142 within the outer panel 110.

Figure 9:
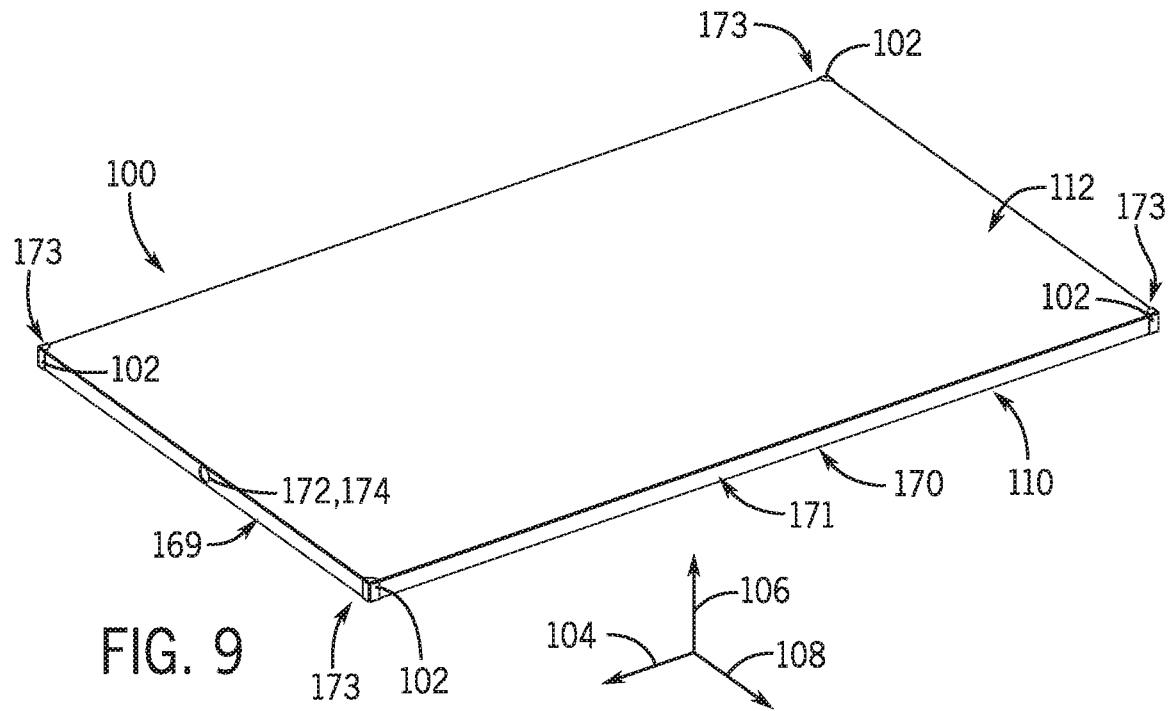
FIG. 9 is a perspective view of an embodiment of a panel assembly for an HVAC system, in accordance with an aspect of the present disclosure.

The following discussion continues with reference to FIG. 6. As noted above, the outer panel 110 and the inner panel 112 may be configured to engage with one another in a nested configuration. For example, the outer panel 110 may include a first length dimension 160 that extends between inner surfaces of the first flange 114 and the third flange 118 and may include a first width dimension 162 that extends between inner surfaces of the second flange 116 and the fourth flange 120. The inner panel 112 may include a second length dimension 164 that extends between outer surfaces of the first flange 126 and a third flange of the inner panel 112, which is opposite to the first flange 126, and may include a second width dimension 166 that extends between outer surfaces of the second flange 128 and a fourth flange of the inner panel 112, which is opposite to the second flange 128. In some embodiments, the first length dimension 160 and the first width dimension 162 of the outer panel 110 may be substantially equal to or marginally greater than the second length dimension 164 and the second width dimension 166, respectively, of the inner panel 112. Accordingly, the outer panel 110 may be configured to receive the inner panel 112 and enable the outer and inner panels 110, 112 to transition to a nested configuration 170, as shown in FIG. 9, in which the inner panel 112 is nested within the outer panel 110. In the illustrated embodiment of FIG. 9, in the nested configuration 170, the first flange 114, the second flange 116, the third flange 118, and the fourth flange 120 of the outer panel 110 respectively define a first face 169, a second face 171, a third face, and a fourth face of the panel assembly 100. As such, the first, second, third, and fourth faces 169, 171 of the panel assembly 100 may terminate in respective corners 173 of the panel assembly 100. Moreover, in the nested configuration 170, the outer panel 110 and the inner panel 112 may enclose a space, referred to herein as an insulating space, between the outer and inner panels 110, 112. The insulating space may be configured to receive an insulating material, such as expanding foam, which may be injected into the insulating space during manufacture of the panel assembly 100.

For example, the first lip 122 may include a first injection aperture 172 that is configured to align with a second injection aperture 174 of the second lip 130 when the outer and inner panels 110, 112 are in the nested configuration 170. Accordingly, the first and second injection apertures 172, 174 may form a flow path into the insulating space that enables an injection tool to inject an insulating material, such as expanding foam or another suitable insulating material, into the insulating space of the panel assembly 100.

For example, during manufacture of the panel assembly 100, the injection tool may inject liquid expanding foam into the insulating space via the flow path formed by the first and second injection apertures 172, 174. Upon injection into the insulating space, the expanding foam may expand to occupy substantially all of the insulating space. A vent port 176 formed within the first lip 122, the second lip 130, or both, may enable air to vent from the insulating space when the expanding foam is injected into the insulating space and/or while the expanding foam expands within the insulating space. In some embodiments, the expanding foam may continue to expand upon filling a volume the insulating space, such that the expanding foam may pressurize the insulating space and leak out of the insulating space via the first slots 142 of the first lip 122 and the second slots 152 of the second lip 130. That is, the insulating material may leak from respective corners of the panel assembly 100. Indeed, in some embodiments, the first slots 142 of the first lip 122 may align with the second slots 152 of the second lip 130 in the nested configuration 170 of the panel assembly 100, such that the first and second slots 142, 152 may collectively form slots of the panel assembly 100 that may extend through the panel assembly 100 from an outer surface of the panel assembly 100 to the insulating space. Accordingly, embodiments of the panel assembly 100 discussed herein are equipped with the end caps 102, which are configured to extend over the corners of the panel assembly 100 to block or substantially mitigate leakage of the insulating material from the insulating space. That is, the end caps 102 may block leakage of the insulating material through the slots in the corners 173 of the panel assembly 100.

Figure 10:
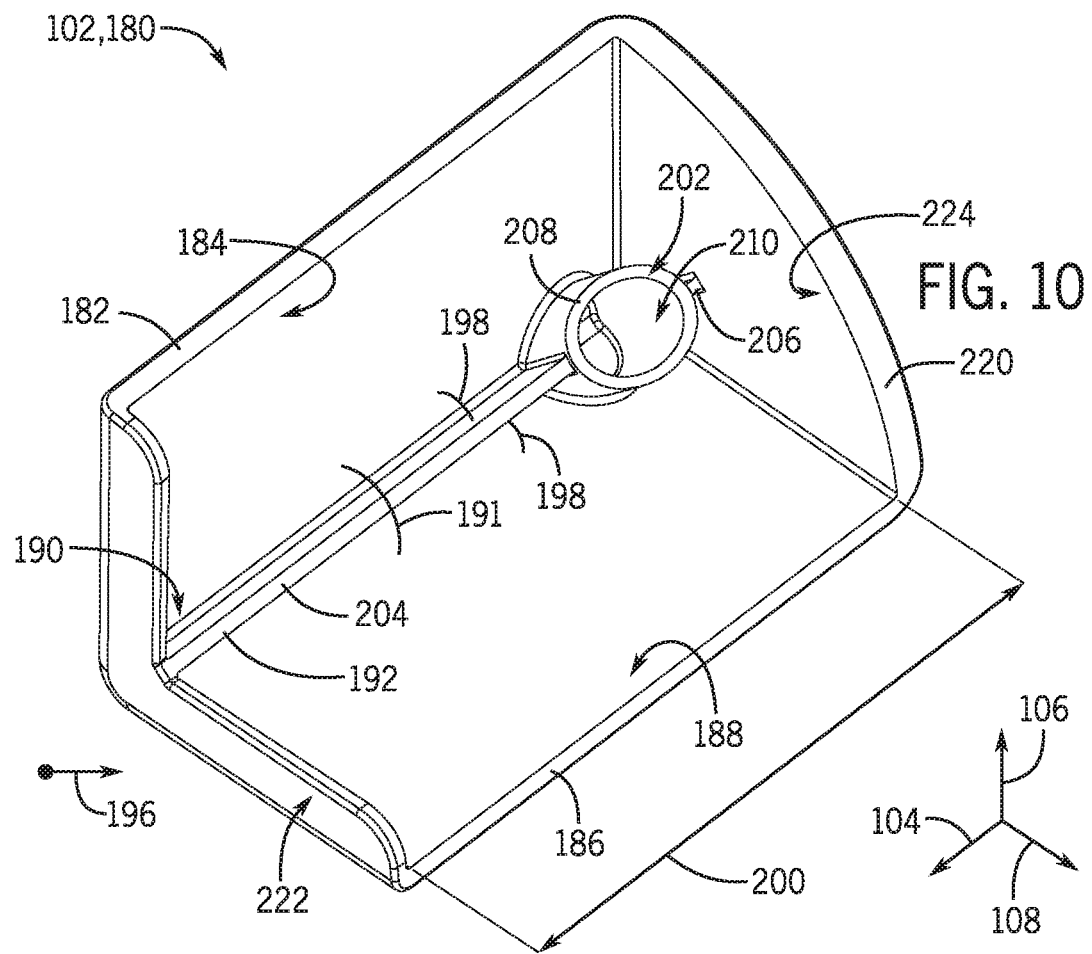
FIG. 10 is a perspective view of an embodiment of an end cap for a panel assembly of an HVAC system, in accordance with an aspect of the present disclosure.

For example, FIG. 10 is a perspective view of an embodiment of an end cap 180 that may be included as one of the end caps 102. In the illustrated embodiment, the end cap 180 includes a first flange 182 having a first surface 184 and a second flange 186 having a second surface 188. The first flange 182 and the second flange 186 may be joined at a vertex 190 and may extend generally crosswise to one another from the vertex 190. For example, in some embodiments, the first flange 182 may extend from the vertex 190 generally along the vertical axis 106, and the second flange 186 may extend from the vertex 190 generally along the lateral axis 108. Accordingly, an angle 191 between the first flange 182 and the second flange 186 may be approximately 90 degrees.

In some embodiments, a rib 192 may extend from the vertex 190 in an intermediate direction 196, such that respective angles 198 between the rib 194 and the first and second flanges 182, 186 are approximately 45 degrees. That is, the intermediate direction 196 may extend along a plane formed by the vertical axis 106 and the lateral axis 108 and may generally bisect an angle formed between the vertical axis 106 and the lateral axis 108. The rib 192 may span across an inner length 200 of the end cap 180 or may span across a portion of the inner length 200.

For example, in some embodiments, the end cap 180 includes a protrusion 202 that extends generally along the intermediate direction 196 from the first surface 184, the second surface 188, and the vertex 190. Therefore, the protrusion 202 may divide the rib 192 into a first rib portion 204 and a second rib portion 206. Indeed, as shown in the illustrated embodiment, the protrusion 202 may include a boundary 208 that defines an open interior region 210 of the protrusion 202 that does not include the rib 192. However, in other embodiments, the rib 192 may extend through the protrusion 202 and across the open interior region 210 along the length of the vertex 190.

In some embodiments, the protrusion 202 may include an oblong cross-sectional geometry or a circular cross-section geometry. In other embodiments, the protrusion 202 may include any other suitable cross-sectional geometry, such as, for example, a rectangular cross-sectional geometry or a triangular cross-sectional geometry. As discussed in detail below, the rib 192 and/or the protrusion 202 may be configured to engage with one of the slots 136 of the panel assembly 100 to enable the end cap 180 to couple to a corner of the panel assembly 100. It should be noted that, in certain embodiments, the rib 192 or the protrusion 202 may be omitted from the end cap 180. In such embodiments, the rib 192 and the protrusion 202 may individually couple the end cap 180 to the panel assembly 100.

Figure 11:
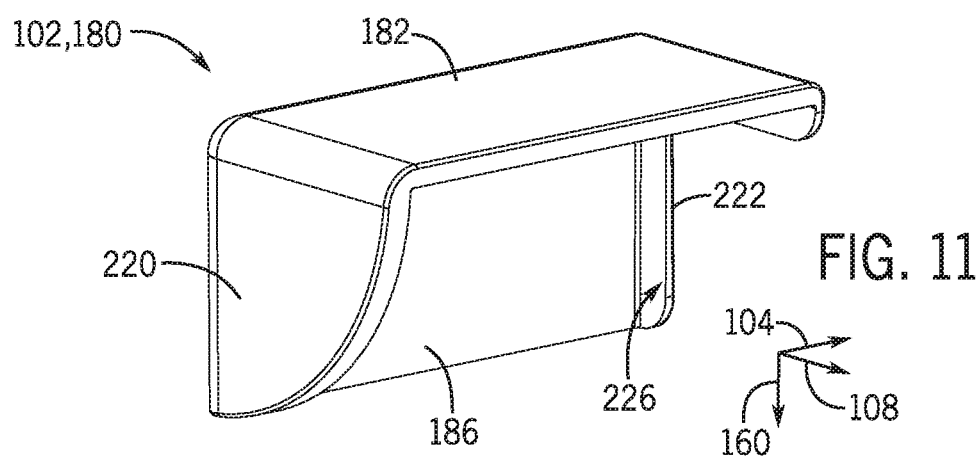
FIG. 11 is a perspective view of an embodiment of an end cap for a panel assembly of an HVAC system, in accordance with an aspect of the present disclosure.

In the illustrated embodiment, the end cap 180 includes a third flange 220 and a fourth flange 222 that each extend generally perpendicularly to the first flange 182 and the second flange 186. Accordingly, a third surface 224 of the third flange 220 and a fourth surface 226, as shown in FIG. 11, of the fourth flange 222 may each extend generally perpendicularly to the first surface 184 of the first flange 182 and the second surface 188 of the second flange 186. It should be understood that, in certain embodiments, the third flange 220, the fourth flange 222, or both, may be omitted from the end cap 180. Moreover, although the fourth flange 222 is shown as having a generally L-shaped cross-sectional shape in the illustrated embodiment of FIG. 10, in other embodiments, the fourth flange 222 and the third flange 220 may have a geometrically similar cross-sectional shape.

Figure 12:
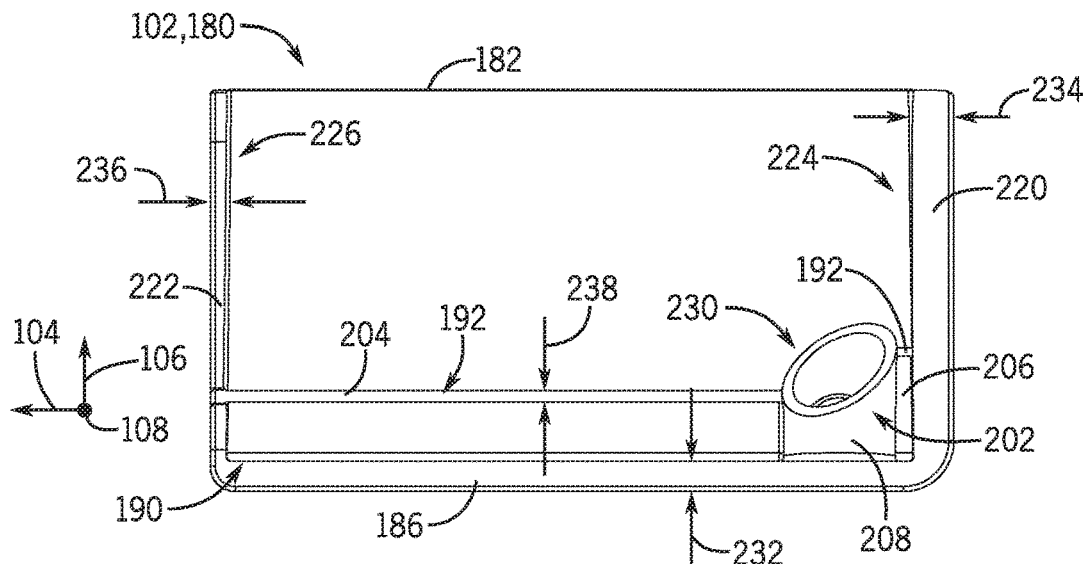
FIG. 12 is a front view of an embodiment of an end cap for a panel assembly of an HVAC system, in accordance with an aspect of the present disclosure.

FIG. 12 is a front view of an embodiment of the end cap 180. In the illustrated embodiment, the first rib portion 204 extends from the vertex 190 by a first dimension that is less than a second dimension by which the second rib portion 206 extends from the vertex 190. In some embodiments, the protrusion 202 includes a chamfer 230 that extends from a distal end of the first rib portion 204 to a distal end of the second rib portion 206. It should be understood that, in some embodiments, the second rib portion 206 may be omitted from the rib 192. Moreover, in certain embodiments, an outer surface of the protrusion 202 may contact the third surface 224 of the third flange 220 or may form a portion of the third surface 224.

In some embodiments, the first flange 182 and the second flange 186 may each include a respective thickness 232 that is less than a thickness 234 of the third flange 220 and that is greater than a thickness 236 of the fourth flange 222. In other embodiments, the first, second, third, and fourth flanges 182, 186, 220, 222 may each include a substantially similar thickness or may include any other suitable thicknesses. The rib 192 may include a thickness 238 that is substantially similar to the thickness 236 of the fourth flange 222, or may include any other suitable thickness.

Figure 13:
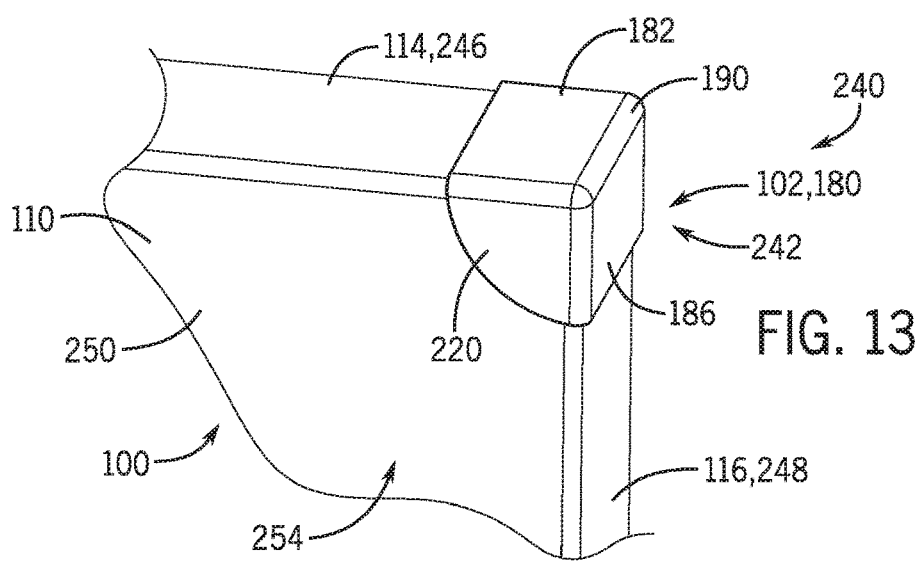
FIG. 13 is a perspective view of an embodiment of a corner of a panel assembly of an HVAC system, in accordance with an aspect of the present disclosure.
Figure 14:
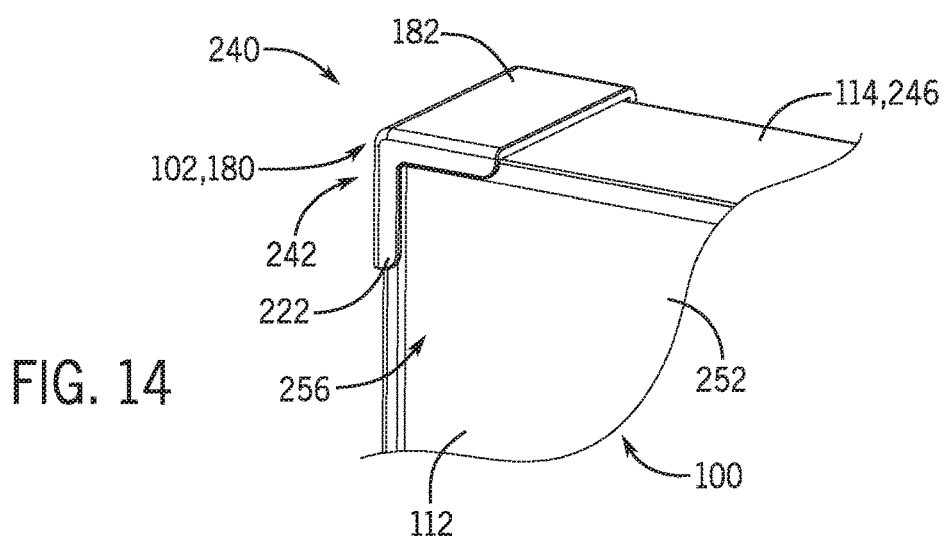
FIG. 14 is a perspective view of an embodiment of a corner of a panel assembly of an HVAC system, in accordance with an aspect of the present disclosure.

FIG. 13 is a perspective view of an embodiment of a corner 240 of the panel assembly 100. Particularly, in the illustrated embodiment, the end cap 180 is positioned in an installed configuration 242 on the corner 240, in which the end cap 180 extends over a portion of the corner 240. FIG. 14 is a perspective view of an embodiment of the end cap 180 in the installed configuration 242. FIGS. 13 and 14 will be discussed concurrently below.

To transition the end cap 180 to the installed configuration 242, the end cap 180 may be positioned over the corner 240 to insert the protrusion 202 into the opening 144 of the outer panel 110 and to insert the rib 192 into the first slot 142 of the outer panel 110 and into the second slot 152 of the inner panel 112. Accordingly, in the installed configuration 242, the first surface 184 of the first flange 182 may extend along a first side 246 of the panel assembly 100, the second surface 188 of the second flange 186 may extend along a second side 248 of the panel assembly 100, the third surface 224 of the third flange 220 may extend along a third side 250 of the panel assembly 100, and the fourth surface 226 of the fourth flange 222 may extend along a fourth side 252 of the panel assembly 100. More specifically, the first surface 184 may extend along the first flange 114 of the outer panel 110, the second surface 188 may extend along the second flange 116 of the outer panel 110, the third surface 224 may extend along an outer surface 254 of the outer panel 110, and the fourth surface 226 may extend along an outer surface 256 of the inner panel 112. It should be appreciated that, in some embodiments, the protrusion 202 may be configured to extend through a suitable opening or cutout in respective flanges 126, 128, 130, 132 of the inner panel 112. As such, the opening 144 may extend through the panel assembly 100 to the insulating space within the panel assembly 100. That is, the opening 144 may form a notch within a corresponding corner of the panel assembly 100.

In some embodiments, the thickness 238 of the rib 192 may be marginally greater than the respective widths 158 of the first slot 142 and the second slot 152 within the outer and inner panels 110, 112. Accordingly, when inserted into the first and second slots 142, 152, the rib 192 may retain the end cap 180 in the installed configuration 242 via, for example, an interference fit, such as a friction fit, and/or a snap-fit, between the first and second slots 142, 152 and the rib 192. Moreover, in some embodiments, the protrusion 202 may include a cross-sectional profile that is geometrically similar to the cross-sectional profile of the opening 144 and/or that is marginally larger than the cross-sectional profile of the opening 144. Accordingly, when inserted into the opening 144, the protrusion 202 may facilitate retention of the end cap 180 in the installed configuration 242 in addition to, or in lieu of, the rib 192. That is, the protrusion 202 may couple the end cap 180 to the panel assembly via an interference fit, such as a friction fit, and/or a snap-fit, between the protrusion 202 and the opening 144. Indeed, the rib 192 and/or the protrusion 202 may be formed from a deformable material that is configured to compresses or deform when the rib 192 is extended into the first and second slots 142, 152 and when the protrusion 202 is extended into the opening 144, thereby facilitating generation of the aforementioned interference fits. As an example, the end cap 180 may be formed from a single piece of plastic or polymeric material using, for example, an injection molding process.

The interference fit between the rib 192 and the first and second slots 142, 152 and/or between the protrusion 202 and the opening 144 may be sufficient to retain the end cap 180 on the corner 240 during injection of the insulating material into the insulating space of the panel assembly 100 and/or during expansion of the insulating material within the insulating space. Accordingly, the end cap 180 may block leakage of the insulating material through the first slot 142, the second slot 152, and the opening 144 without involving use of dedicated fasteners or adhesives to secure the end cap 180 to the panel assembly 100. However, it should be understood that, in other embodiments, suitable fasteners may be used to couple the end cap 180 to the panel assembly 100 in addition to, or in lieu of, the interference fits discussed above. Moreover, in certain embodiments, the rib 192 and/or the protrusion 202 may include one or more hooks protruding therefrom, which may be configured to engage with the outer and inner panels 110, 112 upon insertion of the rib 192 into the first and second slots 142, 152 and/or upon insertion of the protrusion 202 into the opening 144. As such, the hooks may enable the end cap 180 to couple to the panel assembly 100 via a snap fit.

As set forth above, embodiments of the present disclosure may provide one or more technical effects useful for blocking leakage of insulating material from the slots 136 of the outer and inner panels 110, 112 during manufacture of the panel assembly 100. Indeed, engagement between the rib 192 and the first and second slots 142, 152 and/or engagement between the protrusion 202 and the opening 144 may retain the end cap 180 in the installed configuration 242 during injection of insulating material into the insulating space of the panel assembly 100 and during expansion of the insulating material within the insulating space. Accordingly, the end cap 180 may ensure that the injected insulating material may cure and harden within the insulating space without leaking from the panel assembly 100. It should be understood that the technical effects and technical problems in the specification are examples and are not limiting. Indeed, it should be noted that the embodiments described in the specification may have other technical effects and can solve other technical problems.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) system, comprising:
a panel assembly comprising an outer panel and an inner panel nested within the outer panel to define an interior volume of the panel assembly, wherein the outer panel comprises a first lip having a first face and a second face terminating in a first corner, wherein the inner panel comprises a second lip having a third face and a fourth face terminating in a second corner, and wherein a first slot formed in the first corner is aligned with a second slot formed in the second corner to form a passage into the interior volume; and
an end cap having a first surface and a second surface that are joined at a vertex, wherein the end cap extends over the first corner of the outer panel such that the first surface of the end cap extends along the first face and the second surface of the end cap extends along the second face, wherein the end cap includes a rib extending from the vertex and into the first slot and the second slot to block the passage.

2. The HVAC system of claim 1, wherein the rib is retained within the first slot and the second slot in an interference fit arrangement.

3. The HVAC system of claim 1, wherein the end cap comprises a protrusion extending from the first surface, the second surface, and the vertex, wherein the protrusion is configured to extend into a notch in the first corner that is adjacent to the first slot.

4. The HVAC system of claim 3, wherein the protrusion has an oblong or circular cross-sectional geometry.

5. The HVAC system of claim 3, wherein the rib and the protrusion connect to one another along the vertex.

6. The HVAC system of claim 3, wherein the protrusion has a boundary defining an open interior, wherein the boundary is made from deformable material.

7. The HVAC system of claim 1, wherein the end cap comprises a third surface extending transversely to the first surface and the second surface, and wherein the third surface is configured to extend along a wall of the outer panel.

8. The HVAC system of claim 7, wherein the end cap comprises a fourth surface extending transversely to the first surface and the second surface, wherein the fourth surface is configured to extend along a wall of the inner panel.

9. The HVAC system of claim 1, wherein the end cap is an injection-molded plastic.

10. The HVAC system of claim 1, wherein the first surface and the second surface are generally perpendicular to one another.

11. The HVAC system of claim 1, comprising a plurality of end caps covering a plurality of corners of the panel assembly.

12. A panel assembly of a heating, ventilation, and/or air conditioning (HVAC) system, comprising:
an outer panel;
an inner panel nested within the outer panel to define an interior volume of the panel assembly, wherein the outer panel has a first lip comprising a first face and a second face terminating in a first corner and the inner panel has a second lip comprising a third face and a fourth face terminating in a second corner, wherein a first slot formed in the first corner is aligned with a second slot formed in the second corner to form a passage into the interior volume; and
an end cap having a first surface and a second surface that are joined at a vertex, wherein the end cap extends over the first corner of the outer panel such that the first surface extends along the first face and the second surface extends along the second face, wherein the end cap includes a protrusion and a rib extending from the vertex, wherein the protrusion extends into a notch within the outer panel to couple the end cap to the outer panel in a snap-fit arrangement, and the rib extends into the first slot and the second slot to block the passage.

13. The panel assembly of claim 12, wherein the interior volume is configured to receive an insulating material via an injection aperture of the panel assembly, and the end cap is configured to block leakage of the insulating material from the interior volume and through the first slot, the second slot, and the notch.

14. The panel assembly of claim 12, wherein the end cap includes a third surface and a fourth surface extending from and crosswise to both the first surface and the second surface, wherein the rib includes a first rib portion extending from the fourth surface to the protrusion and includes a second rib portion extending from the protrusion to the third surface.

15. The panel assembly of claim 14, wherein the first rib portion extends from the vertex by a first distance, the second rib portion extends from the vertex by a second distance, and the second distance is different from the first distance.

16. The panel assembly of claim 14, wherein the protrusion includes a chamfer that extends from a distal end of the first rib portion to a distal end of the second rib portion.

17. The panel assembly of claim 12, wherein the end cap is a single piece component made from a plastic material.

18. The panel assembly of claim 12, wherein the end cap includes a third surface and a fourth surface extending from and crosswise to the first surface and the second surface, wherein the third surface is configured to extend along an outer surface of the outer panel extending between the first face and the second face, and the fourth surface is configured to extend along an outer surface of the inner panel extending between the third face and the fourth face.

19. An end cap for a panel assembly of a heating, ventilation, and/or air conditioning (HVAC) system, the end cap comprising:
  a first flange;
  a second flange extending crosswise from the first flange at a vertex;
  a rib extending from the vertex in an extension direction, wherein the rib is configured to extend into a first slot in an outer panel of the panel assembly and into a second slot in an inner panel of the panel assembly that is nested in the outer panel, and wherein the rib is configured to extend into the first slot and the second slot along the extension direction to engage with the outer panel and the inner panel; and
  a protrusion extending from the first flange, the second flange, and the vertex, wherein the protrusion is configured to extend into an opening formed in the outer panel.

20. The end cap of claim 19, comprising:
  a third flange extending from the first flange and the second flange; and
  a fourth flange extending from the first flange and the second flange, wherein the third flange and the fourth flange extend crosswise to the first flange and the second flange.

21. The end cap of claim 20, wherein the first flange and the second flange each include a first thickness, the third flange includes a second thickness, and the fourth flange includes a third thickness, wherein the first thickness, the second thickness, and the third thickness are each different from one another.

22. The end cap of claim 20, wherein the first flange is configured to extend along a first face of the outer panel, the second flange is configured to extend along a second face of the outer panel, the third flange is configured to extend along an outer surface of the outer panel extending between the first face and the second face, and the fourth flange is configured to extend along an outer surface of the inner panel.

23. The end cap of claim 19, wherein the protrusion divides the rib along the vertex into a first rib portion and a second rib portion.

24. The end cap of claim 23, wherein the protrusion includes a boundary that defines a hollow interior region of the protrusion.

* * * * *